United States Patent
Varada et al.

(10) Patent No.: US 11,948,254 B2
(45) Date of Patent: Apr. 2, 2024

(54) PARALLEL PRESENTATION PLATFORM WITH EXTENDED REALITY

(71) Applicant: INTERNATIONAL BUSINESS MACHINES CORPORATION, Armonk, NY (US)

(72) Inventors: Sri Harsha Varada, Vizianagaram (IN); Srikanth Ganivada, Visakhapatnam (IN); Pavan Kumar Penugonda, Anakapalle (IN); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 386 days.

(21) Appl. No.: 17/488,678

(22) Filed: Sep. 29, 2021

(65) Prior Publication Data

US 2023/0100041 A1    Mar. 30, 2023

(51) Int. Cl.
  *G06T 19/00*    (2011.01)
  *G02B 27/01*    (2006.01)
  *G06F 3/01*    (2006.01)
  *G06F 3/04815*    (2022.01)
  *G06F 3/04817*    (2022.01)
  (Continued)

(52) U.S. Cl.
  CPC ........ *G06T 19/006* (2013.01); *G02B 27/0179* (2013.01); *G06F 3/011* (2013.01); *G06F 3/013* (2013.01); *G06F 3/04815* (2013.01); *G06F 3/04817* (2013.01); *G06F 3/0482* (2013.01);
  (Continued)

(58) Field of Classification Search
  None
  See application file for complete search history.

(56) References Cited

U.S. PATENT DOCUMENTS 10,922,892 B1\*  2/2021  Bhushan ............. G06F 3/04883
2008/0147488 A1\*  6/2008  Tunick ................... G06Q 30/04
                                        382/209
(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.
(Continued)

*Primary Examiner* — Jwalant Amin
(74) *Attorney, Agent, or Firm* — CUENOT, FORSYTHE & KIM, LLC

(57) ABSTRACT

A parallel presentation system includes computer hardware including a parallel presentation platform (PPP) connected to an extended reality (XR) system associated with a user. The computer hardware is configured to perform the following operations. A lookup point associated with the user is identified by the PPP. The PPP determines that the user has shifted focus from a first data stream to a second data stream. A shift time associated with the shift along with an identification of the first data stream is stored by the PPP in association with the user. A summarization of the first data stream is generated using a summarization engine of the PPP and the summarization is based upon the shift time and the lookup point. The summarization is forwarded by the PPP to the XR system. Information regarding the summarization is configured to be parallel-presented by the XR system associated with the user.

20 Claims, 9 Drawing Sheets

(51) Int. Cl.
*G06F 3/0482* (2013.01)
*G06F 3/04842* (2022.01)

(52) U.S. Cl.
CPC .. *G06F 3/04842* (2013.01); *G02B 2027/0187* (2013.01)

(56) References Cited

U.S. PATENT DOCUMENTS

| | | | |
|---|---|---|---|
| 2010/0146055 A1* | 6/2010 | Hannuksela | H04N 21/2343 709/224 |
| 2015/0222587 A1* | 8/2015 | Bastide | H04L 51/52 709/206 |
| 2019/0356938 A1* | 11/2019 | Gopalan | H04N 21/234363 |
| 2019/0373326 A1* | 12/2019 | Han | H04N 21/4725 |
| 2020/0357408 A1 | 11/2020 | Boekweg et al. | |
| 2021/0092168 A1 | 3/2021 | Ranalli et al. | |
| 2021/0099317 A1 | 4/2021 | Hilleli et al. | |
| 2021/0099505 A1* | 4/2021 | Ravine | H04L 65/60 |
| 2021/0133658 A1 | 5/2021 | Relangi | |

OTHER PUBLICATIONS

Dar, P., "Thanks to AI, you can now create Cartoons from Text Based Descriptions," [online] Analytics Vidhya © 2013-2021, Apr. 16, 2018, retrieved from the Internet: < https://www.analyticsvidhya.com/blog/2018/04/this-ai-create-cartoons-text-description/>, 4 pg.

"The parallel reality technology and how it will change the world," [online] Misapplied Sciences, retrieved ], retrieved from the Internet: <https://www.misappliedsciences.com/home/technology.html>, 9 pg.

Hernandez, J. et al., "Movement detection and tracking using video frames," In Iberoamerican Congress on Pattern Recognition, Nov. 15, 2009, pp. 1054-1061, Springer, Berlin, Heidelberg.

* cited by examiner

PARALLEL PRESENTATION PLATFORM WITH EXTENDED REALITY

BACKGROUND

The present invention relates to computer-implemented displaying of data streams, and more specifically, to a parallel presentation platform that uses XR (Extended Reality) to parallel present information associated with a summarization of a data stream.

Extended reality (XR) is an umbrella term used to describe a number of related, albeit different technologies used to augment human senses. These technologies include augmented reality (AR), virtual reality (VR), and mixed reality (MR). AR typically involves overlaying digital elements onto a real world view. In other words, a real world view (e.g., a still photo or video) is altered to include additional digital elements that have some perceived relationship with the real world view. VR typically involves the creation of an immersive completely digital environment that can be viewed and interacted with by a user. In MR, aspects of both AR and VR are mixed. These technologies are typically device dependent. For example, a smartphone can be used with AR whereas VR typically requires a head mounted display/headset. MR devices can include transparent wearable glasses that present an overlay of digital content that interacts with real word objects in real-time.

As used herein, the term "XR device" or "XR system" refers to a particular computer-implemented hardware device including one or more of AR, VR, and MR technologies. As used herein, the term "VR object" refers to a digital object being displayed by an XR device regardless of the XR technology being employed. As used herein, the term "VR environment" refers to a digitally-created space in which a VR object can be displayed. As used herein, the term "VR content" refers to all of the VR objects found within the VR environment.

In today's technology-enabled world, a user is oftentimes parallel-engaged with a plurality of tasks involved with a plurality of real-time data streams being presented using one or more of the user's computing devices. However, what oftentimes occurs is that a user may lose focus with regard to one or more of these real-time data streams—thereby losing track of relevant information needed to perform one or more of the tasks being performed by the user. For example, a user may shift focus because one data stream has presented information that requires the user's full attention. Alternatively, a user may lose focus because of a device error (e.g., internet connection has been lost) or the user has stepped away from their office. In these instances, it can be difficult/inconvenient for the user to retrieve information within the data streams that did not have the user's focus. Consequently, there is a need to improve the computer technology associated with presenting these data streams in order to provide for retrieval of important information that the user may have missed.

SUMMARY

A computer-implemented process within a parallel presentation platform that is connected to an extended reality (XR) system associated with a user is disclosed. A lookup point associated with the user is identified by the parallel presentation platform. The parallel presentation platform determines that the user has had a shift in focus from a first data stream to a second data stream. A shift time associated with the shift in focus along with an identification of the first data stream is stored by the parallel presentation platform in association with the user. A summarization of the first data stream is generated using a summarization engine of the parallel presentation platform and the summarization is based upon the shift time and the lookup point. The summarization is forwarded by the parallel presentation platform to the XR system. Information regarding the summarization is configured to be parallel-presented by the XR system associated with the user.

The computer-implemented process can also include the XR system being configured to parallel-present a currently in-focus data stream to the user along with the summarization. Additionally or alternatively, the XR system can be configured to parallel-present a currently in-focus data stream to the user along with an icon generated using the lookup point and associated with the summarization. The parallel presentation platform can be configured to perform an analysis on an indication that the user has shifted focus from the first data stream to the second data stream, and the shift time is stored based upon the analysis. The summarization can be generated using a summarization engine by comparing portions of the first data stream identified using the shift time with the lookup point. The lookup point can be automatically generated using a contextual analysis of a current in-focus data stream. Alternatively, the lookup point can be received by the parallel presentation platform from a user device associated with the user. The summarization can be automatically forwarded, without prompting by the user, to the XR system.

A parallel presentation system includes computer hardware including a parallel presentation platform connected to an extended reality (XR) system associated with a user. The computer hardware is configured to perform the following operations. A lookup point associated with the user is identified by the parallel presentation platform. The parallel presentation platform determines that the user has had a shift in focus from a first data stream to a second data stream. A shift time associated with the shift in focus along with an identification of the first data stream is stored by the parallel presentation platform in association with the user. A summarization of the first data stream is generated using a summarization engine of the parallel presentation platform and the summarization is based upon the shift time and the lookup point. The summarization is forwarded by the parallel presentation platform to the XR system. Information regarding the summarization is configured to be parallel-presented by the XR system associated with the user.

The parallel presentation system can also include the XR system being configured to parallel-present a currently in-focus data stream to the user along with the summarization. Additionally or alternatively, the XR system can be configured to parallel-present a currently in-focus data stream to the user along with an icon generated using the lookup point and associated with the summarization. The parallel presentation platform can be configured to perform an analysis on an indication that the user has shifted focus from the first data stream to the second data stream, and the shift time is stored based upon the analysis. The summarization can be generated using a summarization engine by comparing portions of the first data stream identified using the shift time with the lookup point. The lookup point can be automatically generated using a contextual analysis of a current in-focus data stream. Alternatively, the lookup point can be received by the parallel presentation platform from a user device associated with the user. The summarization can be automatically forwarded, without prompting by the user, to the XR system.

A computer program product includes computer readable storage medium having stored therein program code. The program code, which when executed by a computer hardware system including a parallel presentation platform connected to an extended reality (XR) system associated with, causes the computer hardware system to perform the following operations. A lookup point associated with the user is identified by the parallel presentation platform. The parallel presentation platform determines that the user has had a shift in focus from a first data stream to a second data stream. A shift time associated with the shift in focus along with an identification of the first data stream is stored by the parallel presentation platform in association with the user. A summarization of the first data stream is generated using a summarization engine of the parallel presentation platform and the summarization is based upon the shift time and the lookup point. The summarization is forwarded by the parallel presentation platform to the XR system. Information regarding the summarization is configured to be parallel-presented by the XR system associated with the user.

The computer program product can also include the XR system being configured to parallel-present a currently in-focus data stream to the user along with the summarization. Additionally or alternatively, the XR system can be configured to parallel-present a currently in-focus data stream to the user along with an icon generated using the lookup point and associated with the summarization. The parallel presentation platform can be configured to perform an analysis on an indication that the user has shifted focus from the first data stream to the second data stream, and the shift time is stored based upon the analysis. The summarization can be generated using a summarization engine by comparing portions of the first data stream identified using the shift time with the lookup point. The lookup point can be automatically generated using a contextual analysis of a current in-focus data stream. Alternatively, the lookup point can be received by the parallel presentation platform from a user device associated with the user. The summarization can be automatically forwarded, without prompting by the user, to the XR system.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
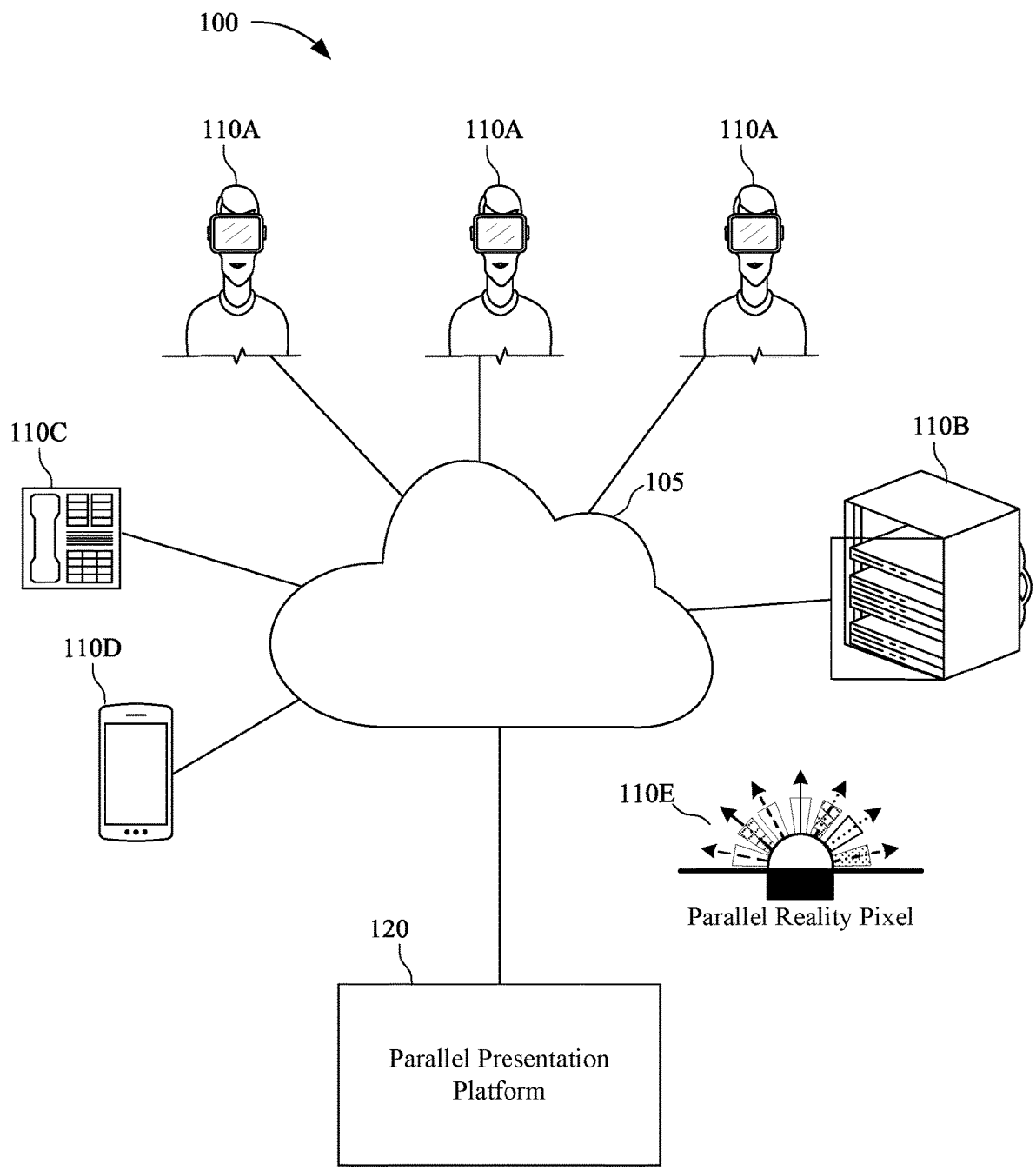
FIG. 1 is a block diagram illustrating an example parallel presentation system according to an embodiment of the present invention.
Figure 4A:
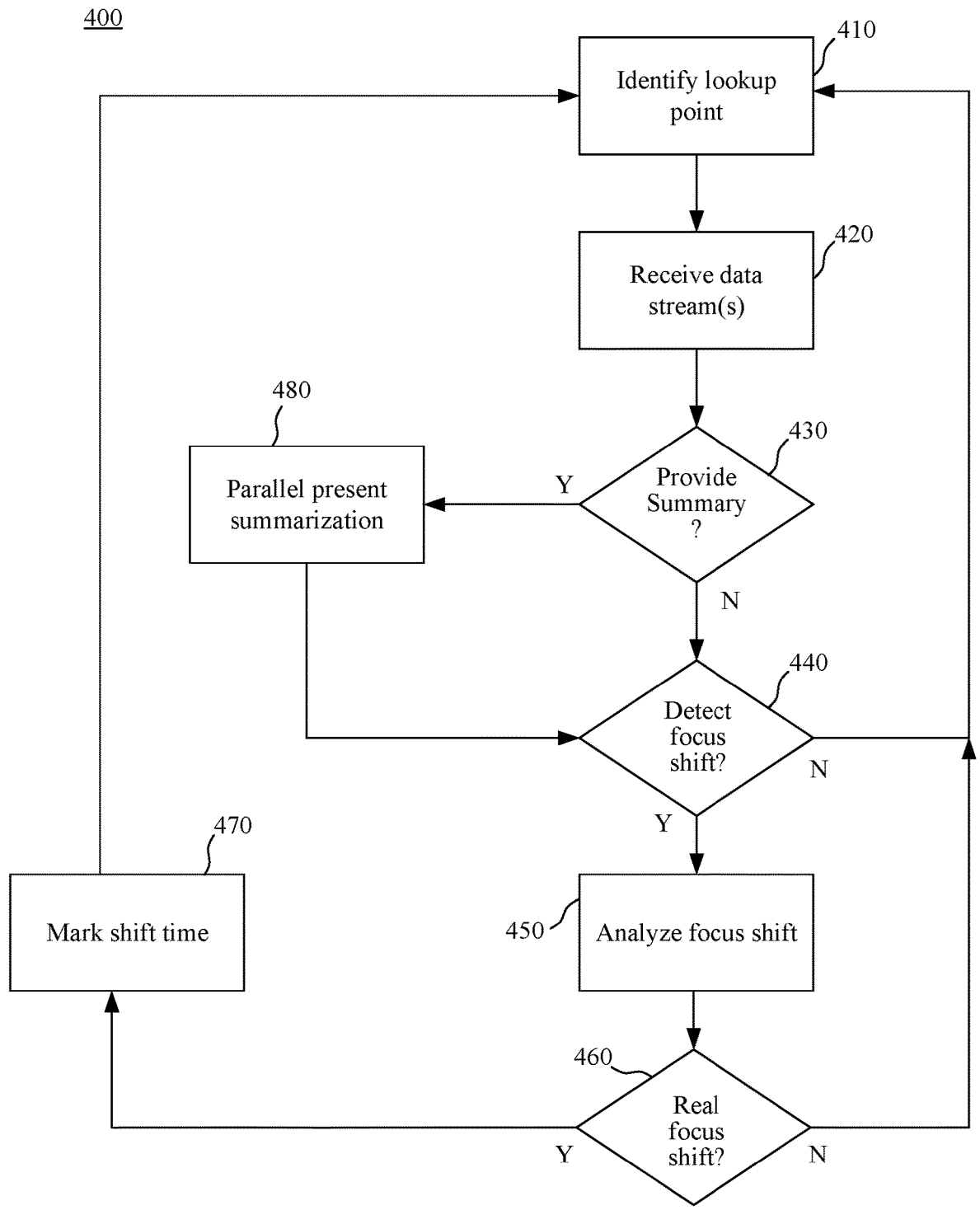
FIGS. 4A, 4B are block diagrams illustrating example methods using the parallel presentation system of FIG. 1 according to an embodiment of the present invention.
Figure 4B:
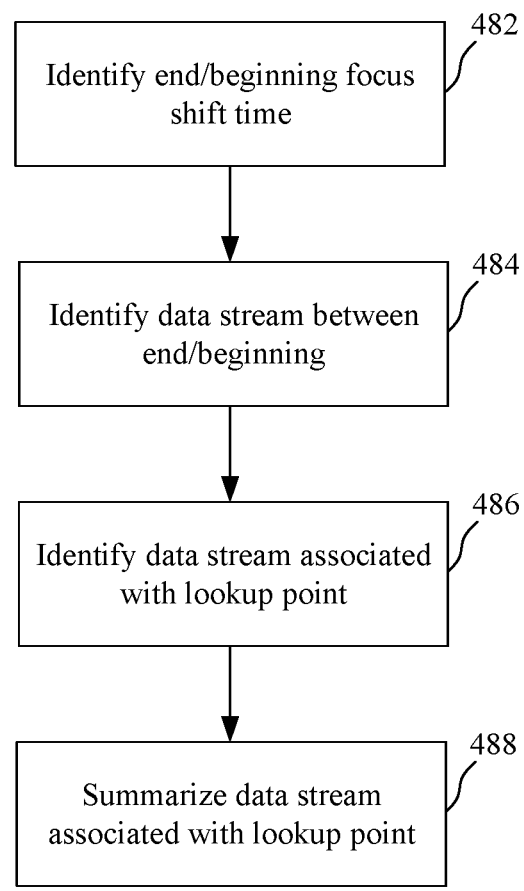

Reference is made to FIG. 1 and FIG. 4A, 4B, which respectively illustrate an parallel presentation system 100 and methodology 400, 401 that uses XR (Extended Reality) to parallel present information associated with a summarization of a data stream. The parallel presentation system includes one of more user devices 110A, each with an extended reality (XR) system 300 (further described with regard to FIG. 5), and a parallel presentation platform 120 (further described with regard to FIG. 2). The data streams can be from the user devices 110A as well as additional IOT (internet of things) devices 110B, 110C, 110D connected to the parallel presentation platform 120 via a network 105, such as the internet and/or wide area network (WAN) and/or local area network (LAN).

In operation, a lookup point associated with the user is identified by the parallel presentation platform 120. The parallel presentation platform 120 determines that the user has had a shift in focus from a first data stream 202A to a second data stream 202B. A shift time associated with the shift in focus along with an identification of the first data stream 202A is stored by the parallel presentation platform 120 in association with the user. A summarization 250 of the first data stream 202A is generated using a summarization engine 220 of the parallel presentation platform 120 and the summarization 250 is based upon the shift time and the lookup point. The summarization 250 is forwarded by the parallel presentation platform 120 to the XR system 300. Information regarding the summarization 250 is configured to be parallel-presented by the XR system 300 associated with the user. Applications present in a host machine can be contextually integrated based upon a key lookup point of different users at a given moment and share required information to the parallel presentation platform 120 in the host machine.

Alternatively or in addition to, information regarding the summarization 260 can be presented using a parallel reality or multi-view pixel device 110E, which is a particular type of display technology that enables the pixels contained therein to send different colors of light in tens of thousands or even millions of directions. Consequently, this display technology permits many different users see completely different content on the same screen, simultaneously. In combination with location technology and sensors, content can be targeted in real time to specific locations, users and objects and can follow them in three-dimensional space as they move. Using this parallel reality device 110E, for example, a team of users could be viewing the device 110E and if a particular user missed a portion, the summarization 260 can be provided to that user within disturbing the activities of the other users viewing the device 110E.

Reference is made to the operations illustrated in FIG. 4A. In 410, the parallel presentation platform 120 receives one or more lookup points regarding a particular user. If one or more lookup points have already been provided, for example, as the process 400 has looped back from operations 440 or 470, the operations of 410 can be skipped and the process 400 can proceed to 420.

As used herein, a "lookup point" is defined as an item/area of interest in a data stream 202A, 202B for which the user would like summary information. As used herein, a "data stream" is defined as continuously changing computer data being real-time presented to one or more users over a network 105. An example of a data stream 202A, 202B could include a telephone conference being conducted over a VOIP phone 110C and/or a mobile phone 110D. Another example is a video conference between a number of connected user devices 110A being conducted using a video conferencing server 110B. Another example would be contemporaneously-presented text messages being presented within a user device 110A. These examples are intended to be illustrative and not necessarily limiting.

Examples of a lookup point could be, for example, a manager of a rocket launching projected having an interest in a particular component of the rocket assembly. Another example would be a team member for a particular project having an interest in an approval status of a particular aspect of the project. Yet another example, would be a quality assurance engineer having an interest in a particular part defect code. The lookup point can be in the form of a question to which an answer is sought. For example, the question may be "how many servers were installed in Q3 of 2021?" These examples are intended to be illustrative and not necessarily limiting.

The parallel presentation platform 120 is not limited in which the manner by which a lookup point is received. The lookup point could be entered using a user device 110A connected to a parallel presentation platform (PPP) interface 205 of the parallel presentation platform 120. This lookup point for one user could also be provided to the parallel presentation platform 120 by another user, e.g., a manager or co-worker. In addition to or alternatively, the parallel presentation platform 120 can automatically generate the lookup point. For example, the parallel presentation platform 120 may be configured to access electronic communications associated with the user and based upon natural language processing of these electronic communications in association with a machine learning engine, identify one or more lookup points. For example, an email that contains the statement "we need to get an approval on the Johnson project by 5 PM tomorrow" may lead to a lookup point associated with the 'approval for Johnson project' being generated. In addition to or alternatively, the parallel presentation platform 120 can include a machine learning engine that uses contextual analysis of a current data stream as well as past data streams associated with a particular user/team to determine an item/area of interest for that user/team.

Although the lookup points are described as being associated with a particular individual, the parallel presentation platform 120 is not limited in this manner. For example, a lookup point can be assigned to a team of individuals. In this situation, each individual's user profile 210 will include the lookup point.

Once a lookup point has been received/generated, the lookup point can be stored within a user profile 210 associated with the particular user. The user profile 210 can also store more than one lookup point for the particular user. The user profile 210 can optionally store time limitations for use with a particular lookup point. For example, the lookup point may be time sensitive, and a user may only be interested in a particular lookup point for a particular period of time. The time period is not limited to a particular format. For example, the time period may have an end time, a beginning time, a combination of the two, a particular trigger associated with an event among others. Additionally, the time period can be provided to the parallel presentation platform 205, e.g., via the PPP interface 205. In addition to or alternatively, the time period can be automatically generated. For example, using the example email that contains the statement "we need to get an approval on the Johnson project by 5 PM tomorrow," a time period may be generated that time limits the lookup to 5 PM tomorrow.

In addition, the user profile 210 can contain preferences/options, selected by the user, as to when the summarization 250 is to be provided and/or how the user is to be notified when a summarization 250 is available. For example, a summarization 250 can be provided automatically without prompting by the user and/or upon based upon a request/prompt by the user. As one option, a user may want a summarization 250 immediately after a portion of the data stream 202A, 202B that is relevant to the lookup point is identified. Alternatively, the parallel presentation platform 205 can send the user a notification that has a summarization 250 available, and the user may have an option to real-time select when to receive the summarization 250. For example, the user may a user may recognize that the user has a current slack period and can choose to receive one or more summarizations 250 at that time. In yet another example, the parallel presentation platform 120 may send the summarization 250 to a XR system 300 such that the summarization 250 can be viewed at the user's leisure.

Still further, the user profile 210 can contain preferences/options, selected by the user, as to how the summarization 250 is to be provided. For example, the user may select to receive raw (i.e., unedited) portions of the data stream 202A, 202B deemed relevant to the lookup point. As another alternative, the user may select to receive an automatically generated summary, using the data summarization engine 220, of the portions of the data stream 202A, 202B deemed relevant to the lookup point. Using the example described above in which the lookup point is the question "how many servers were installed in Q3 of 2021?", the summarization 250 could be a restatement followed by the answer (e.g., "823 server were installed in Q3 of 2021"). These examples are illustrative as to how a user may select to the one or more summarizations 250 and are not necessarily limiting. Each of these aforementioned options can be applied globally. Alternatively, different options be specific to different lookup points.

In 420, the parallel presentation platform 205 receives the data stream 202A, 202B from one or more connected devices 110. Data from the data stream 202A, 202B is stored within the shared data store 230 for future evaluation by the comparison engine 215 and the data summarization engine 220. Although illustrated as being found within the parallel presentation platform 205 all or portions of the shared data store 230 can be found external to the parallel presentation platform 205. These connected devices 110, both associated with the user and external to the user's control, can include a transmission service configured to automatically forward the data stream 202A, 202B to the parallel presentation platform 205. In addition to or alternative, the particular user device 110A associated with the user may also be configured to forward one or more of these data streams 202A, 202B to the parallel presentation platform 205. Regardless of the approach, the parallel presentation platform 205 preferably receives all the data streams 202A, 202B with which the user may be engaged. As an illustrative example, in a situation in which multiple users 110A are engaged in a virtual meeting, each of the users 110A can enable an integration application that transmits data streams associated with each of these users to the parallel presentation platform 205.

In 430, by the parallel presentation platform 205, a determination is made whether to provide the user with a summarization 250 of the data stream 202A, 202B deemed relevant to the lookup point. As discussed in 420, there are many different approaches to how and when the summarization 250 itself and/or how and when the notification that a summarization 250 is available can be provided to the user. If a determination is made to provide the summarization 250 to the user, the process 400 proceeds to 440, in which the summarization 250 is presented. The parallel presentation of the summarization 250 is discussed in more detail with regard to FIG. 4B. If the summarization 250 is not to be provided the operation proceeds to 440.

Figure 2:
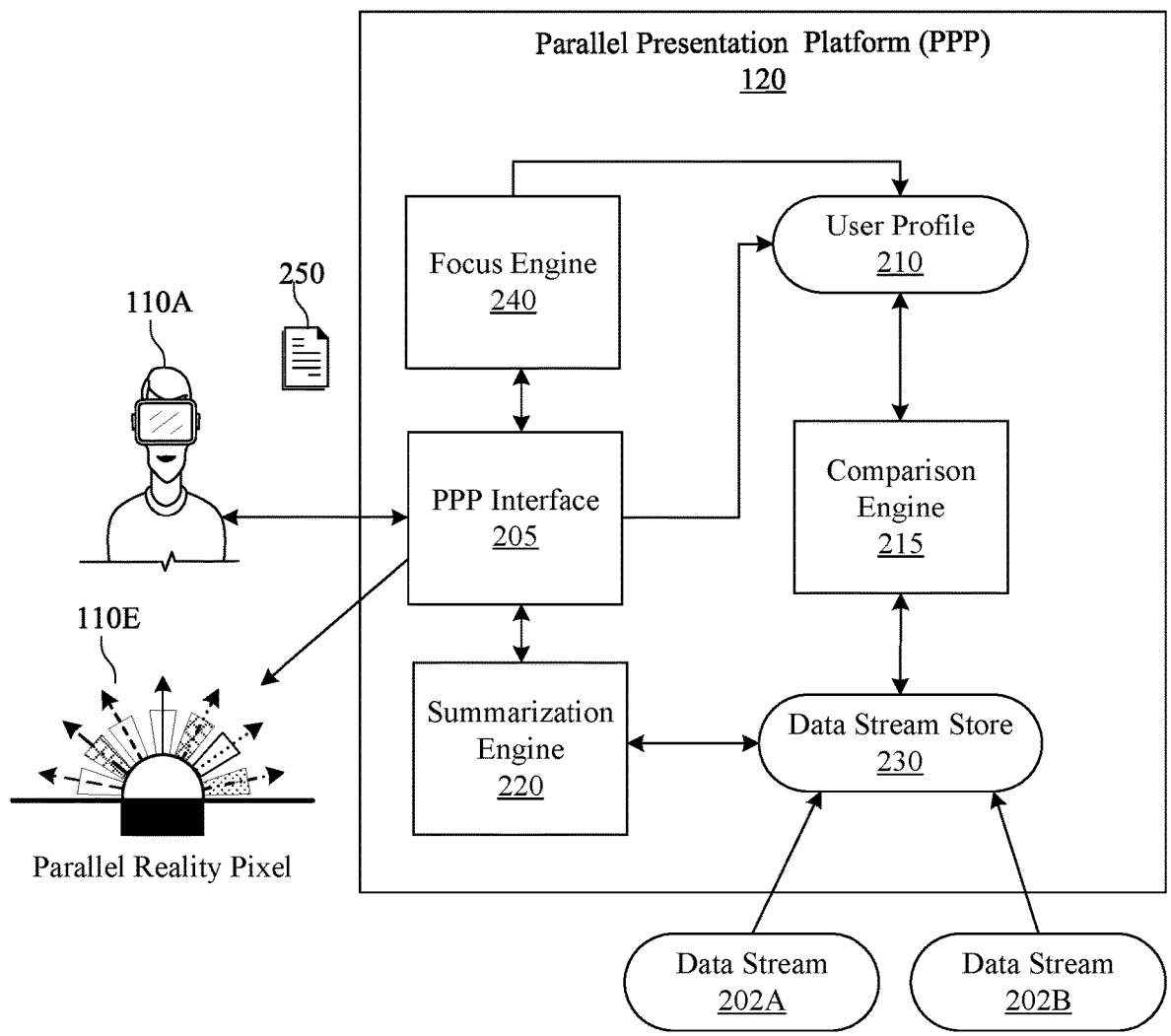
FIG. 2 is a block diagram illustrating an example architecture of a parallel presentation platform for use with the parallel presentation system of FIG. 1 according to an embodiment of the present invention.

In 440, a shift in the user's focus is detected. Referring to FIG. 2, for example, the user can initially be focused on data stream 202A but subsequently shift focus to data stream 202B. For example, a user may be engaged in a conversation with a second user during a virtual conference but switch to a conversation with a third user during the virtual conference. Detecting a shift in focus can be made by the user device 110A alone or in conjunction with the parallel presentation platform 120 using a focus engine 240. Accordingly, aspects of the focus engine 240 may be contained within the user device 110A and/or within the parallel presentation platform 120. An indication of a shift in focus can be, for example, while the user being on a conference call, the user opening up an application in the user's computer. Another indication of a shift in focus, for example, could be the detection of the user looking away from the user device 110A of the user. However, not all shifts in focus result in the user losing focus from the data stream 202A in which the user was previously engaged in. As used herein, the term "shift in focus" means that a determination has been made, using a predefined threshold, that the user's focus has shifted from one data stream 202A to another data stream 202B. An indication of a shift in focus that does not meet the predefined threshold is considered a momentary or insignificant shift in focus. If any indication of a possible shift in focus is not determined, the process 400 returns to operation 410. However, if an indication of a possible shift in focus is received, the process 400 proceeds to 450.

In 450, the focus engine 240 performs an analysis on the indication of a possible shift in focus to determine whether the user's focus has shifted from one data stream 202A to another data stream 202B based upon the predefined threshold. The focus engine 240 is not limited in the manner by which the analysis on the indication of a possible shift in focus to determine whether the user's focus has shifted from one data stream 202A to another data stream 202B based upon the predefined threshold is performed. Determining whether a user has shifted focus from one data stream 202A to another data stream 202B is known in the art, and the present parallel presentation platform 120 is not limited as to a particular approach. In certain aspects, the predefined threshold is a set length of time. In other aspects, the focus engine 240 can include a machine learning engine that contextually analyzes a user's current activities and, based upon past circumstances, determines that the user has had a shifted focus from one data stream 202A to another data stream 202B. Naturally, to determine a "shift" in focus, the focus engine 240 begins by first determining the data stream 202A that is the subject of the initial focus of the user.

In 460, if a shift in focus is determined (i.e., not a momentary or insignificant shift in focus), the process 400 proceeds to 470. Otherwise, the process 400 returns to operation 410. In 470, a shift time (i.e., the time at which the shift in focus is detected) determined marked, and this shift time can be stored, for example, in the user profile 210. The shift time can serve to both act as the end of focus from one data stream 202A and the beginning of focus to another data stream 202B. Consequently, the user profile 210 can keep a record of the user's focus as to any number of data streams 202A, 202B over time.

Referring to FIG. 4B, a process 401 of generating the summarization is illustrated. Notably, and consistent with the discussion above, the individual operations 482, 484, 486, 488 can be performed any time during process 400 and not necessarily during operation 480. For example, the summarization of those portions of the data stream 202A, 202B determined to be relevant to the lookup point can occur before or after the user has requested the summarization 250.

In 482, the comparison engine 215 identifies, using the end/beginning times stored within the user profile 210. These end/beginning times indicate what particular data stream(s) 202A has the current focus of the user and what particular data stream(s) 202B do not have the current focus of the user. In 484, the comparison engine 215 uses this information to determine what portions of the data streams 202A, 202B for which it is presumed that the user has not focused on. Consequently, not all portions of the data streams 202A, 202B will be analyzed by the comparison engine with regard to the lookup points.

In 486, the comparison engine 215 compares the portions of the data streams 202A, 202B for which it is presumed that the user has not focused with the one or more lookup points stored within user profile 210 to identify those portions of the data stream that are relevant to a particular lookup point. The parallel presentation platform 205 is not limited as to when this comparison occurs. For example, the comparison engine 215 can make the comparison as the data stream is contemporaneous being received in 420. In addition to or alternatively, the comparison engine 215 can make the comparison at predetermined intervals (e.g., every 1 minute or every 5 minutes) after the data stream has been stored within the shared data store 230. In addition to or alternatively, the comparison engine 215 can make the comparison in request to a specific request for a summarization. Those portions of the comparison engine 215 deemed relevant to the particular lookup point can be flagged within the shared data store 230, separately stored within the shared data store 230, and/or provided to the data summarization engine 220. Additionally, the comparison engine 215 can use the timing information optionally found within the user profile 210 to further filter what portions of the data streams 202A, 202B will be analyzed by the comparison engine with regard to the lookup points.

In 488, once the portions of the comparison engine 215 deemed relevant to the particular lookup point are identified, the summarization engine 220 generates the summarization 250 from the portions of the comparison engine 215 deemed relevant to the particular lookup point are identified. As discussed above, there are many different approaches by which these portions of data can be summarized into a summarization 250, and the present summarization engine 220 is not limited as to a particular approach. However, in certain aspects, the summarization 250 is configured to be parallel-presented to the user using an XR system 300. Further aspects of the parallel-presentation of the summarization 250 to the user using the XR system 300.

Figure 3:
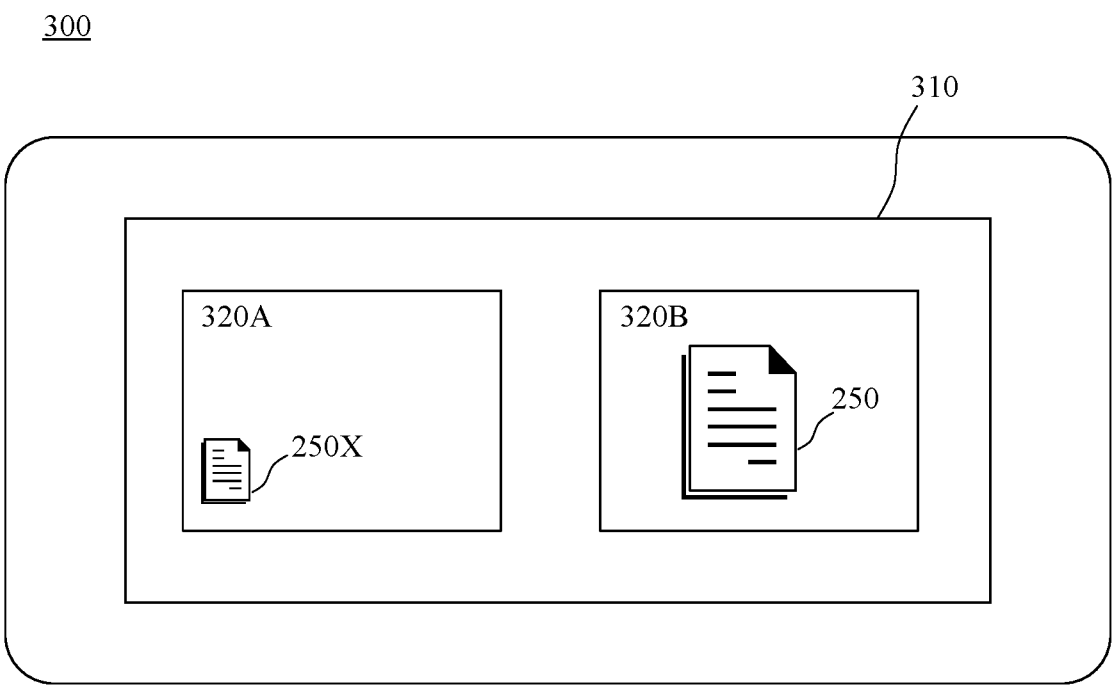
FIG. 3 illustrates an exemplary parallel-presentation of information being displayed in a VR environment according to an embodiment of the present invention.

FIG. 3 illustrates an example approach by which the summarization 250 is parallel-presented to the user using the XR system 300. The XR system 300 can include, for example, a display region 310 that is divided into a pair of separate screens/windows 320A, 320B. In 320A, the XR system 300 can present, to the user, data from the data stream 202A that has the current focus of the user. Additionally, in 320B, the summarization 250 can be parallel presented to the user using the XR system 300. Although not limited in this manner, the data and/or summarization 250 can be presented as VR content within a VR environment.

In certain aspects, the whole display region 310 may be devoted to the current data stream 202A that has the current focus of the user. However, by selecting an icon 250X within the display region 320A, the display region 320A can be minimized and the second display region 320B can be parallel-presented. In this manner, the user can maintain focus on the data from the data stream 202A in display region 302A while also reviewing the summarization 250 in display region 302B. In other aspects, however, the selection of the icon 250X can cause the display region 320A to be completely minimized while display region 320B is being displayed.

Although not limited in this manner, the parallel presentation platform 120 can associate the previously-identified lookup point and/or the summarization 250 with an icon 250X. In certain aspects, the icon 250X can be selected by the user to be associated with a particular lookup topic. Alternatively, the icon 250X can be automatically generated by the parallel presentation platform 120. For example, the lookup points that can be converted to a animation or emoji format using a CRAFT (Composition, Retrieval, and Fusion Network) Model that can be parallel-presented with the information from display region 202A. As an example of an animation, if the lookup topic was the question "did the deployment got completed to pre-production environment?" an animation with a block dropped into a pre-production block with a green tick can presented if the answer to that question is "yes." If the answer is "no," a cross icon can be presented against the pre-production box.

Figure 5:
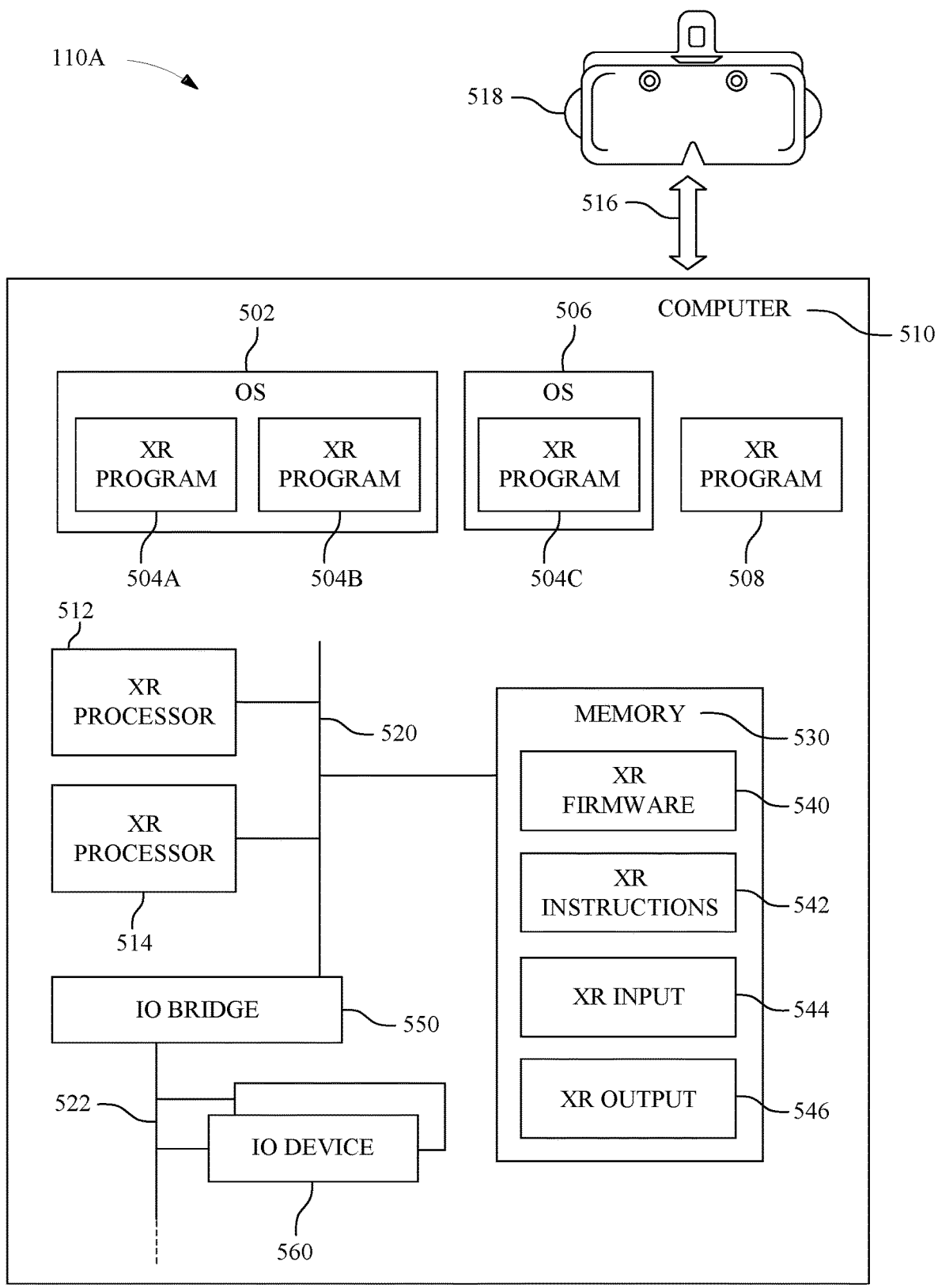
FIG. 5 is a block diagram illustrating an example computer hardware system for implementing the XR system of FIG. 1

FIG. 5 is an example of an example of the XR system 300 previously illustrated in FIG. 3. As shown, the XR system 300 includes an audio/video (A/V) headset 518, as referred to as smart glasses, augmented reality device or an extended reality headset. The XR system 300 also includes a XR computer 510. Although illustrated as being separate from the headset 518, one or more portions of the XR computer 510 can be embedded within the headset 518. The example XR system 300, and/or components thereof, are not intended to be necessarily limiting as to the present disclosure.

The XR computer 510 can include one or more XR processors 512, 514, which can be a single processor or a multi-threaded processor, a general purpose or a special purpose processor, a co-processor, or any of a variety of processing devices that can execute computing instructions. If one or more portions of the XR computer 510 are separate from the headset 518, interface 516 couples XR computer 510 to the headset 518. The XR processors 512, 514 can be connected by memory interface 520 to memory 530, which can be a cache memory, a main memory, a flash memory, or a combination of these or other varieties of electronic hardware devices capable of storing information and, optionally, making the information, or locations storing the information within the memory, accessible to the XR processors 512, 514. The XR computer 510 can include an IO bridge 350, which can be connected to the memory 530 and/or XR processors 512, 514 by a memory interface 320. The IO bridge 550 can interface with the memory interface 520 to IO devices, such as IO device 560. The interface 522 can be any of a variety of IO interfaces, such as a PCI-Express (PCI-E) bus, and IO bridge 550 can, correspondingly, be a PCI-E bridge, and IO device 560 can be a PCI-E device (e.g., a disk drive), or PCI-E adapter (e.g., a network interface card, or a disk adapter). The IO devices 560—an be any of a variety of peripheral IO devices or IO adapters connecting to peripheral IO devices. For example, IO device 560 can be a graphic card, keyboard or other input device, a hard drive or other storage device, a network interface card, etc. Additionally, the XR system 300 can communicate with other devices, such as the container orchestration platform 120 illustrated in FIG. 1, using the IO device 560.

The XR computer 510 can include instructions executable by one or more of the XR processors (or, processing elements, such as threads of a XR processor) 512, 514. As illustrated, XR computer 510 includes a plurality of programs, such as XR programs 504A, 504B, 504C (collectively, "XR programs 504"), and 508, and operating systems OS 502 and 506. The XR programs 504 can be, for example, an application program (e.g., an application for generating XR expressions), a function of an operating system (e.g., a device driver capable of operating an IO device, such as 560), or a utility or built-in function of a computer, such as 510. A XR program 504 can be a hypervisor, and the hypervisor can, for example, manage sharing resources of the computer (e.g., a XR processor or regions of a memory, or access to an IO device) among a plurality of programs or OSes. A XR program 504 can be a program that embodies the methods, or portions thereof, of the disclosure. For example, a XR program 504 can be a program that executes on a XR processor 512, 514 of XR computer 510 to perform method 200 of FIG. 2, or portions and/or modifications thereof, within the scope of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
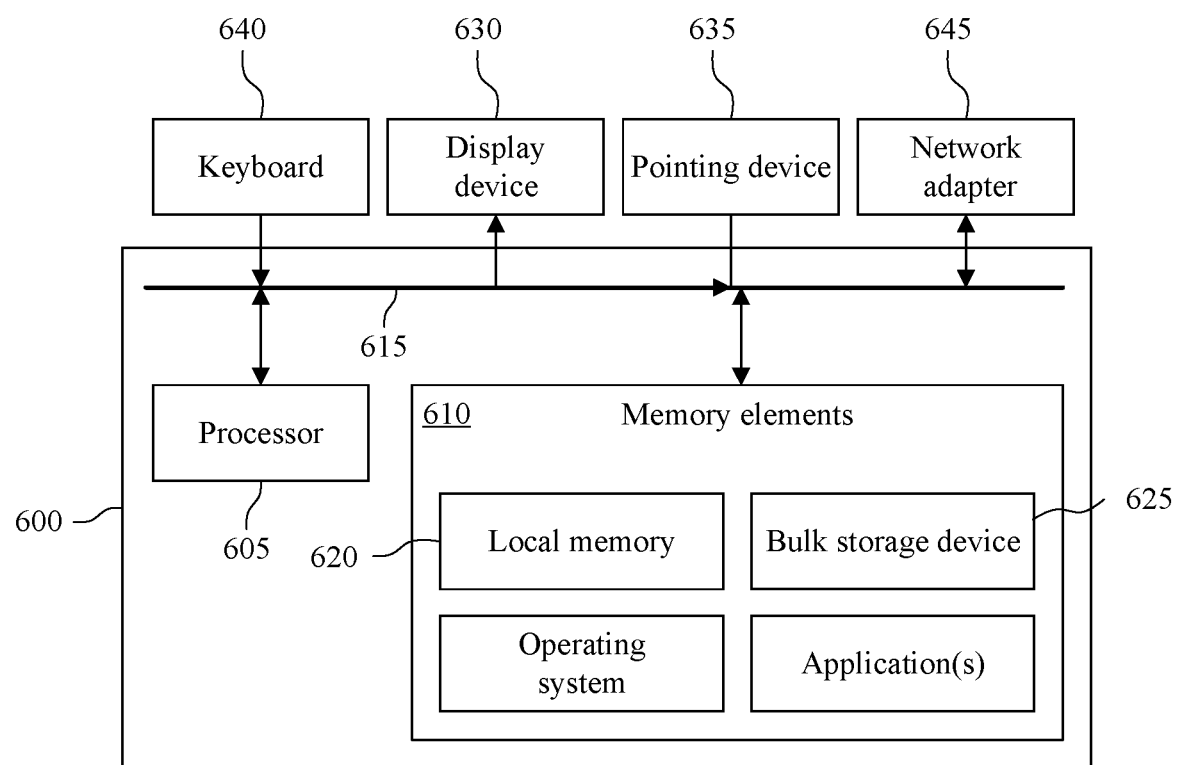
FIG. 6 is a block diagram illustrating an example of computer hardware system for implementing the development server of FIG. 2.

FIG. 6 is a block diagram illustrating example architecture for a data processing service 600 for serving as the parallel presentation platform 120. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a graphics processing unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the parallel presentation platform 120 of FIG. 1. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
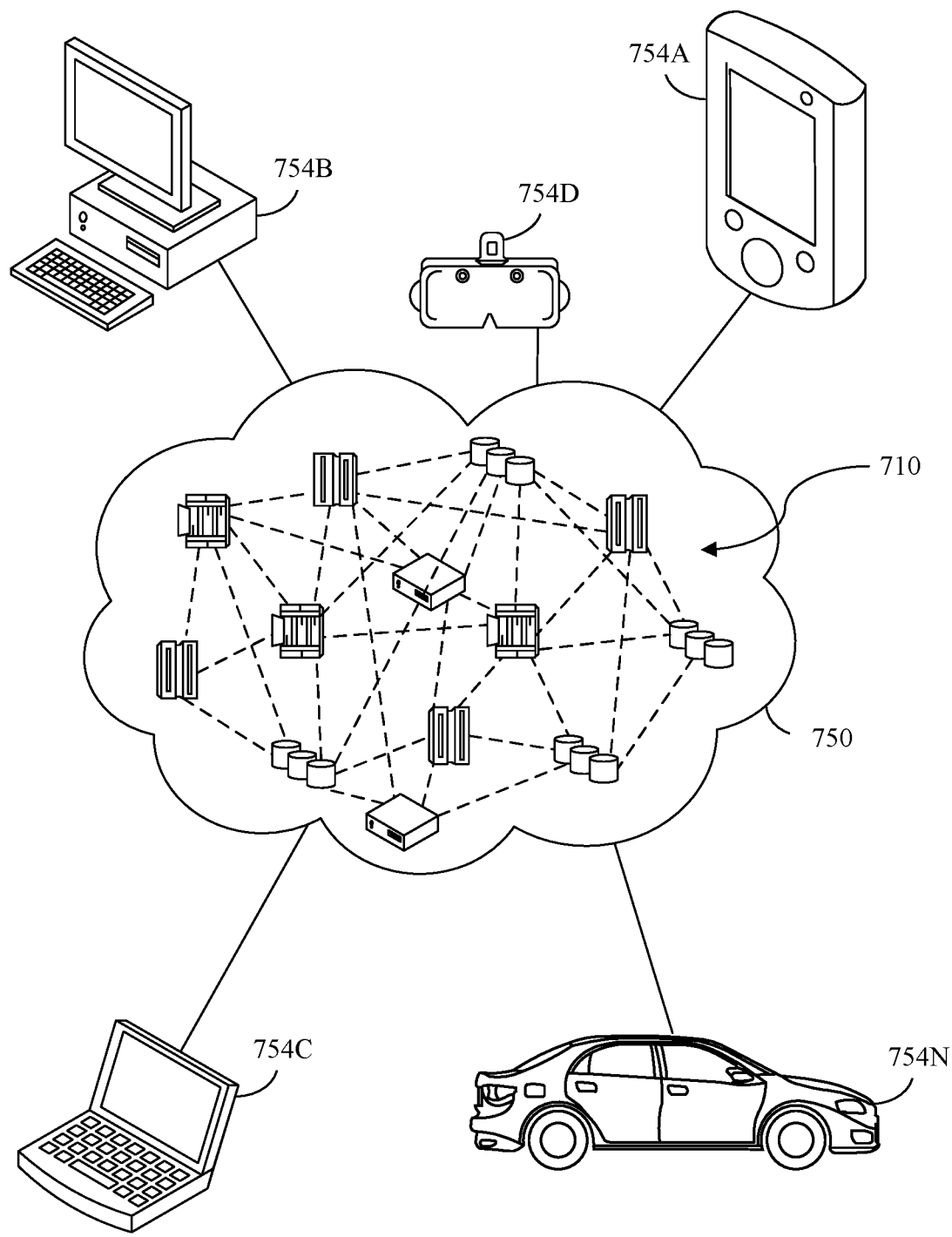
FIG. 7 depicts a cloud computing environment according to an embodiment of the present invention.

Referring now to FIG. 7, illustrative cloud computing environment 750 to be used with the API optimizing system is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, XR headset 754D, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
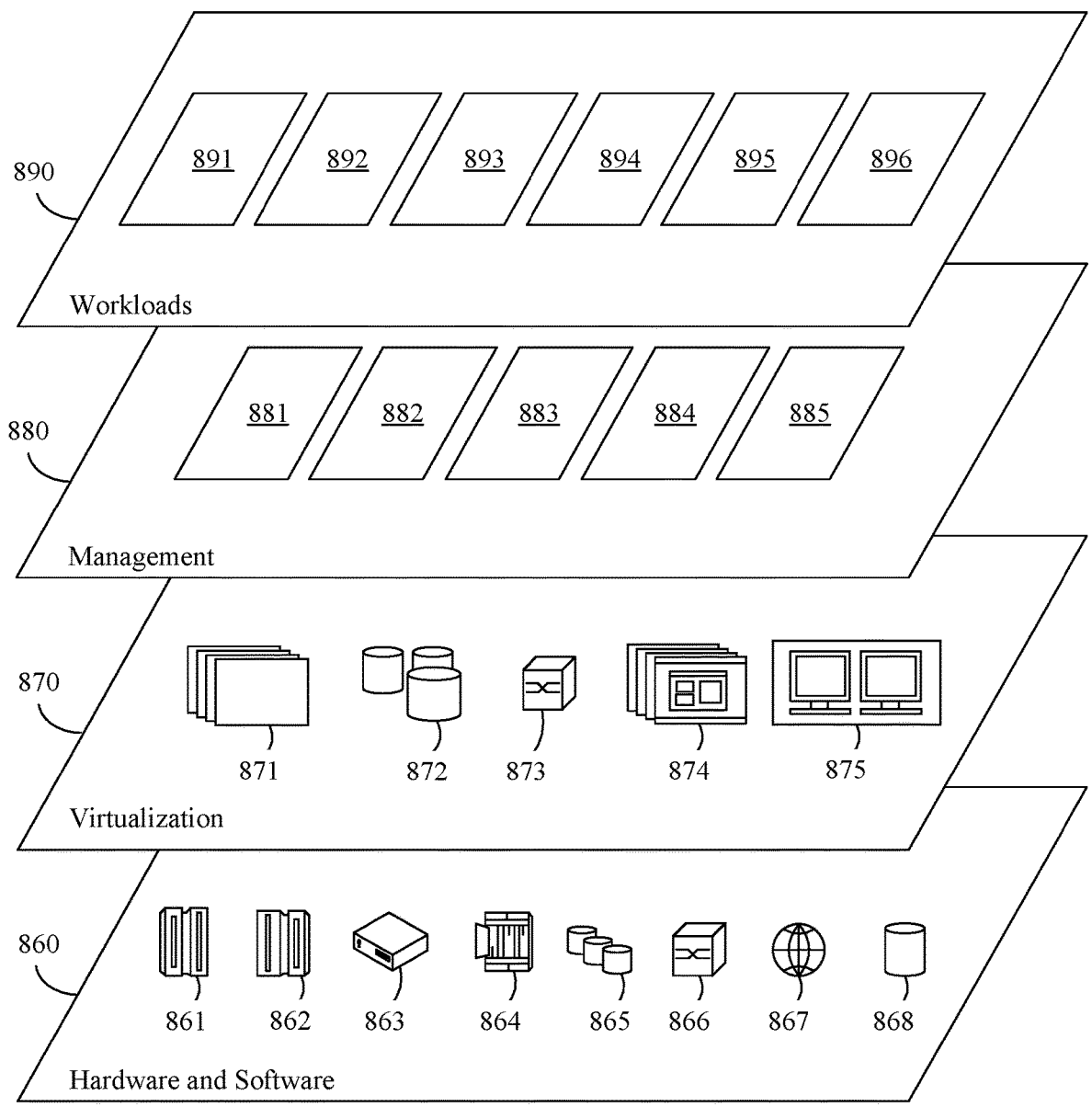
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the parallel presentation platform 896.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be necessarily limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be necessarily limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process within a parallel presentation platform that is connected to an extended reality (XR) system associated with a user, comprising:
   identifying, by the parallel presentation platform, a lookup point associated with the user;
   determining, by the parallel presentation platform, that the user has had a shift in focus from a first data stream to a second data stream;
   storing, by the parallel presentation platform in association with the user, a shift time associated with the shift in focus along with an identification of the first data stream;
   generating, using a summarization engine of the parallel presentation platform and based upon the shift time and the lookup point, a summarization of the first data stream; and
   forwarding, by the parallel presentation platform and to the XR system, the summarization, wherein
   information regarding the summarization is configured to be parallel-presented by the XR system associated with the user.

2. The process of claim 1, wherein
the XR system is configured to parallel-present a currently in-focus data stream to the user along with the summarization.

3. The process of claim 1, wherein
the XR system is configured to parallel-present a currently in-focus data stream to the user along with an icon generated using the lookup point and associated with the summarization.

4. The process of claim 1, wherein
the parallel presentation platform is configured to perform an analysis on an indication that the user has shifted focus from the first data stream to the second data stream, and
the storing the shift time is based upon the analysis.

5. The process of claim 1, wherein
the summarization is generated using a summarization engine by comparing portions of the first data stream identified using the shift time with the lookup point.

6. The process of claim 1, wherein
the lookup point is automatically generated using a contextual analysis of a current in-focus data stream.

7. The process of claim 1, wherein
the lookup point is received by the parallel presentation platform from a user device associated with the user.

8. The process of claim 1, wherein
the summarization is automatically forwarded, without prompting by the user, to the XR system.

9. A parallel presentation system, comprising:
computer hardware including a parallel presentation platform connected to an extended reality (XR) system associated with a user, wherein the computer hardware is configured to perform:
   identifying, by the parallel presentation platform, a lookup point associated with the user;
   determining, by the parallel presentation platform, that the user has had a shift in focus from a first data stream to a second data stream;
   storing, by the parallel presentation platform in association with the user, a shift time associated with the shift in focus along with an identification of the first data stream;
   generating, using a summarization engine of the parallel presentation platform and based upon the shift time and the lookup point, a summarization of the first data stream; and
   forwarding, by the parallel presentation platform and to the XR system, the summarization, wherein
information regarding the summarization is configured to be parallel-presented by the XR system associated with the user.

10. The parallel presentation system of claim 9, wherein
the XR system is configured to parallel-present a currently in-focus data stream to the user along with the summarization.

11. The parallel presentation system of claim 9, wherein
the XR system is configured to parallel-present a currently in-focus data stream to the user along with an icon generated using the lookup point and associated with the summarization.

12. The parallel presentation system of claim 9, wherein
the parallel presentation platform is configured to perform an analysis on an indication that the user has shifted focus from the first data stream to the second data stream, and
the storing the shift time is based upon the analysis.

13. The parallel presentation system of claim 9, wherein
the summarization is generated using a summarization engine by comparing portions of the first data stream identified using the shift time with the lookup point.

14. The parallel presentation system of claim 9, wherein
the lookup point is automatically generated using a contextual analysis of a current in-focus data stream.

15. The parallel presentation system of claim 9, wherein
the lookup point is received by the parallel presentation platform from a user device associated with the user.

16. The parallel presentation system of claim 9, wherein the summarization is automatically forwarded, without prompting by the user, to the XR system.

17. A computer program product, comprising:
a computer readable storage medium having stored therein program code,
the program code, which when executed by a computer hardware system including a parallel presentation platform connected to an extended reality (XR) system associated with a user, cause the computer hardware system to perform:
  identifying, by the parallel presentation platform, a lookup point associated with the user;
  determining, by the parallel presentation platform, that the user has had a shift in focus from a first data stream to a second data stream;
  storing, by the parallel presentation platform in association with the user, a shift time associated with the shift in focus along with an identification of the first data stream;
  generating, using a summarization engine of the parallel presentation platform and based upon the shift time and the lookup point, a summarization of the first data stream; and
  forwarding, by the parallel presentation platform and to the XR system, the summarization, wherein
  information regarding the summarization is configured to be parallel-presented by the XR system associated with the user.

18. The computer program product of claim 17, wherein the XR system is configured to parallel-present a currently in-focus data stream to the user along with the summarization.

19. The computer program product of claim 17, wherein the XR system is configured to parallel-present a currently in-focus data stream to the user along with an icon generated using the lookup point and associated with the summarization.

20. The computer program product of claim 17, wherein the parallel presentation platform is configured to perform an analysis on an indication that the user has shifted focus from the first data stream to the second data stream,
the storing the shift time is based upon the analysis, and
the summarization is generated using a summarization engine by comparing portions of the first data stream identified using the shift time with the lookup point.

* * * * *